United States Patent
Lin et al.

(10) Patent No.: US 11,477,490 B2
(45) Date of Patent: Oct. 18, 2022

(54) VIDEO PROCESSING METHOD WITH SAMPLE ADAPTIVE OFFSET FILTERING DISABLED ACROSS VIRTUAL BOUNDARY IN RECONSTRUCTED FRAME AND ASSOCIATED VIDEO PROCESSING APPARATUS

(71) Applicant: MEDIATEK INC., Hsin-Chu (TW)

(72) Inventors: Sheng-Yen Lin, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/134,196

(22) Filed: Dec. 25, 2020

(65) Prior Publication Data

US 2021/0211736 A1    Jul. 8, 2021

Related U.S. Application Data

(60) Provisional application No. 62/956,680, filed on Jan. 3, 2020.

(51) Int. Cl.
| | |
|---|---|
| *H04N 19/82* | (2014.01) |
| *H04N 19/117* | (2014.01) |
| *H04N 19/184* | (2014.01) |
| *H04N 19/132* | (2014.01) |
| *H04N 19/597* | (2014.01) |

(52) U.S. Cl.
CPC ........... *H04N 19/82* (2014.11); *H04N 19/117* (2014.11); *H04N 19/132* (2014.11); *H04N 19/184* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 2013/0051454 A1* | 2/2013 | Sze | .................. | H04N 19/91 |
| | | | | 375/240.02 |
| 2013/0094568 A1* | 4/2013 | Hsu | .................. | H04N 19/82 |
| | | | | 375/240.02 |
| 2017/0366808 A1* | 12/2017 | Lin | .................. | H04N 19/82 |
| 2018/0352225 A1* | 12/2018 | Guo | .................. | H04N 19/136 |

(Continued)

FOREIGN PATENT DOCUMENTS

| | | |
|---|---|---|
| CN | 103503456 A | 1/2014 |
| WO | 2018/191224 A1 | 10/2018 |
| WO | 2019/060443 A1 | 3/2019 |

OTHER PUBLICATIONS

"International Search Report" dated Mar. 25, 2021 for International application No. PCT/CN2020/142007, International filing date:Dec. 31, 2020.

*Primary Examiner* — Dave Czekaj
*Assistant Examiner* — Shanika M Brumfield
(74) *Attorney, Agent, or Firm* — Winston Hsu (57) ABSTRACT

A video processing method includes receiving a reconstructed frame, and applying in-loop filtering, by at least one in-loop filter, to the reconstructed frame. The step of in-loop filtering includes performing a sample adaptive offset (SAO) filtering operation. The step of performing the SAO filtering operation includes keeping a value of a current pixel unchanged by blocking the SAO filtering operation of the current pixel included in the reconstructed frame from being applied across a virtual boundary defined in the reconstructed frame.

8 Claims, 7 Drawing Sheets

(56) References Cited

U.S. PATENT DOCUMENTS

| | | | |
|---|---|---|---|
| 2019/0089961 A1* | 3/2019 | Ahn | H04N 19/159 |
| 2019/0215532 A1* | 7/2019 | He | H04N 13/117 |
| 2020/0120359 A1* | 4/2020 | Hanhart | H04N 19/167 |
| 2020/0260120 A1* | 8/2020 | Hanhart | H04N 19/82 |

* cited by examiner

VIDEO PROCESSING METHOD WITH SAMPLE ADAPTIVE OFFSET FILTERING DISABLED ACROSS VIRTUAL BOUNDARY IN RECONSTRUCTED FRAME AND ASSOCIATED VIDEO PROCESSING APPARATUS

CROSS REFERENCE TO RELATED APPLICATIONS

This application claims the benefit of U.S. provisional application No. 62/956,680, filed on Jan. 3, 2020 and incorporated herein by reference.

BACKGROUND

The present invention relates to processing a reconstructed frame generated during video encoding or video decoding, and more particularly, to a video processing method with sample adaptive offset (SAO) filtering disabled across a virtual boundary in a reconstructed frame and an associated video processing apparatus.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image content corresponding to a sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

Data compression/encoding of the omnidirectional video may be achieved by a conventional video coding standard that generally adopt a block-based coding technique to exploit spatial and temporal redundancy. For example, the basic approach is to divide a source frame into a plurality of blocks (or coding units), perform intra prediction/inter prediction on each block, transform residues of each block, and perform quantization and entropy encoding. Besides, a reconstructed frame is generated to provide reference pixel data used for coding following blocks. For certain video coding standards, in-loop filter(s) may be used for enhancing the image quality of the reconstructed frame. For example, a sample adaptive offset (SAO) filter is used by a video encoder to minimize mean sample distortion of a region. A video decoder is used to perform an inverse operation of a video encoding operation performed by the video encoder. Hence, the video decoder also has in-loop filter(s) used for enhancing the image quality of the reconstructed frame. For example, an SAO filter is also used by the video decoder to reduce the distortion.

In general, the omnidirectional video content corresponding to the sphere is transformed into a sequence of images, each of which is a projection-based frame with a 360-degree image content represented by one or more projection faces arranged in a 360-degree Virtual Reality (360 VR) projection layout, and then the sequence of the projection-based frames is encoded into a bitstream for transmission. However, the projection-based frame may have image content discontinuity at face edges (i.e., face boundaries). Applying the in-loop filtering (e.g., SAO filtering) to these discontinuous face edges may result in poor visual quality and decreased coding efficiency.

SUMMARY

One of the objectives of the claimed invention is to provide a video processing method with sample adaptive offset (SAO) filtering disabled across a virtual boundary in a reconstructed frame and an associated video processing apparatus.

According to a first aspect of the present invention, an exemplary video processing method is disclosed. The exemplary video processing method includes: receiving a reconstructed frame, and applying in-loop filtering, by at least one in-loop filter, to the reconstructed frame that comprises performing a sample adaptive offset (SAO) filtering operation. The step of performing the SAO filtering operation comprises: keeping a value of a current pixel unchanged by blocking the SAO filtering operation of the current pixel included in the reconstructed frame from being applied across a virtual boundary defined in the reconstructed frame.

According to a second aspect of the present invention, an exemplary video processing apparatus is disclosed. The exemplary video processing apparatus includes an encoding circuit arranged to receive a video frame and encode the video frame to generate a part of a bitstream. When encoding the video frame, the encoding circuit is arranged to generate a reconstructed frame, and apply in-loop filtering to the reconstructed frame. The in-loop filtering comprises a sample adaptive offset (SAO) filtering operation performed at an SAO filter included in the encoding circuit. The SAO filter is arranged to keep a value of a current pixel unchanged by blocking the SAO filtering operation of the current pixel included in the reconstructed frame from being applied across a virtual boundary defined in the reconstructed frame.

According to a third aspect of the present invention, an exemplary video processing apparatus is disclosed. The exemplary video processing apparatus includes a decoding circuit arranged to receive a bitstream and decode a part of the bitstream, wherein the part of the bitstream comprises encoded information of a video frame. When decoding the part of the bitstream, the decoding circuit is arranged to generate a reconstructed frame, and apply in-loop filtering to the reconstructed frame. The in-loop filtering comprises a sample adaptive offset (SAO) filtering operation performed at an SAO filter included in the decoding circuit. The SAO filter is arranged to keep a value of a current pixel unchanged by blocking the SAO filtering operation of the current pixel included in the reconstructed frame from being applied across a virtual boundary defined in the reconstructed frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The virtual boundary may be defined by different applications or needs. Taking 360-degree video for example, the layout of a specific projection format may have one or more discontinuous boundaries between adjacent projection faces packed in a projection-based frame, where the discontinuous boundaries may be defined as virtual boundaries. Applying the in-loop filtering (e.g., SAO filtering) to these discontinuous boundaries (e.g., virtual boundaries) may result in poor visual quality and decreased coding efficiency. To address this issue, the present invention proposes an innovative SAO filter design that is allowed to have SAO filtering disabled across the discontinuous boundaries (e.g., virtual boundaries) under an edge offset mode. Further details of the proposed SAO filter design are described with reference to the accompanying drawings.

For better understanding of technical features of the proposed SAO filter design, the following assumes that a video encoder using the proposed SAO filter design is arranged to encode a projection-based frame into a bitstream, and a video decoder using the proposed SAO filter design is arranged to decode a bitstream to generate a decoded projection-based frame. However, this is for illustrative purposes only, and is not meant to be limitations of the present invention. In practice, any video processing apparatus using the proposed SAO filter design for dealing with SAO filtering of a reconstructed frame with one or more virtual boundaries (which may be a projection-based frame with one or more virtual boundaries, or may be a non-projection-based frame with one or more virtual boundaries) falls within the scope of the present invention.

Figure 1:
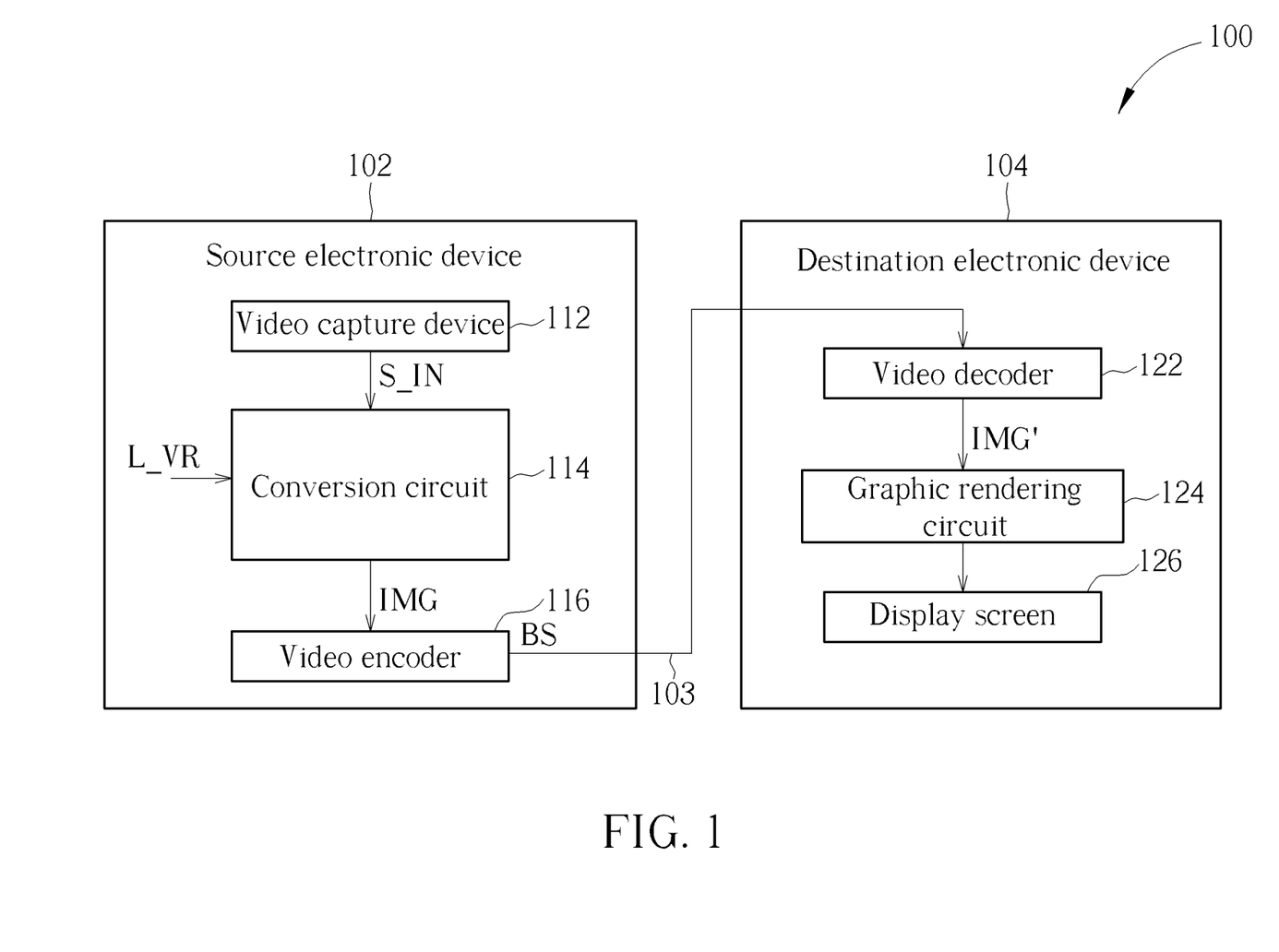
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional content S_IN. For example, the projection-based frame IMG may be one frame included in a sequence of projection-based frames generated from the conversion circuit 114. The video encoder 116 is designed to encode/compress the projection-based frame IMG to generate a part of a bitstream BS, and outputs the bitstream BS to the destination electronic device 104 via a transmission means 103. For example, the sequence of projection-based frames may be encoded into the bitstream BS, such that a part of the bitstream BS transmits encoded information of the projection-based frame IMG. In addition, the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display screen 126. The video decoder 122 is designed to receive the bitstream BS from the transmission means 103 (e.g., a wired/wireless communication link or a storage medium), and decode the received bitstream BS. For example, the video decoder 122 generates a sequence of decoded frames by decoding the received bitstream BS, where the decoded frame IMG' is one frame included in the sequence of decoded frames. That is, since apart of the bitstream BS transmits encoded information of the projection-based frame IMG, the video decoder 122 decodes a part of the received bitstream BS to generate the decoded frame IMG' which is a result of decoding the encoded information of the projection-based frame IMG. In this embodiment, the projection-based frame IMG to be encoded by the video encoder 116 has a 360 VR projection format with a projection layout. Hence, after the bitstream BS is decoded by the video decoder 122, the decoded frame IMG' has the same 360 VR projection format and the same projection layout. The graphic rendering circuit 124 is coupled between the video decoder 122 and the display screen 126. The graphic rendering circuit 124 renders and displays an output image data on the display screen 126 according to the decoded frame IMG'. For example, a viewport area associated with a portion of the 360-degree content carried by the decoded frame IMG' may be displayed on the display screen 126 via the graphic rendering circuit 124.

The present invention proposes techniques at the coding tool (s) to conquer the negative effect introduced by image content discontinuity boundaries (i.e., discontinuous face edges) resulting from packing of projection faces. In other words, the video encoder 116 can employ a proposed coding tool for encoding the projection-based frame IMG, and the counterpart video decoder 122 can also employ the proposed coding tool for generating the decoded frame IMG'. For example, the video encoder 116 employs the proposed SAO filter for in-loop filtering, and the video decoder 122 also employs the proposed SAO filter for in-loop filtering.

Figure 2:
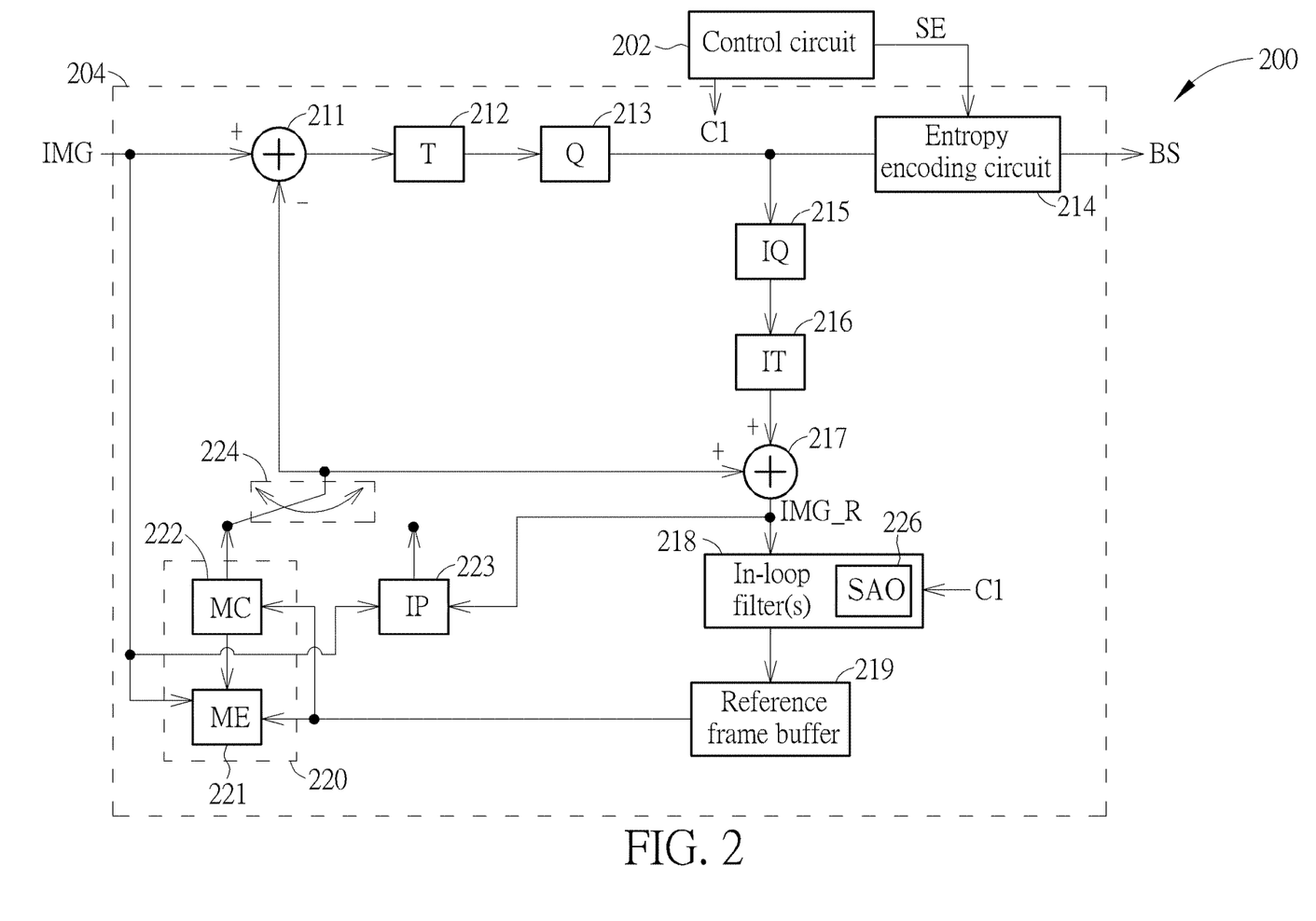
FIG. 2 is a diagram illustrating a video encoder according to an embodiment of the present invention.

FIG. 2 is a diagram illustrating a video encoder according to an embodiment of the present invention. The video encoder 116 shown in FIG. 1 may be implemented using the video encoder 200 shown in FIG. 2. The video encoder 200 includes a control circuit 202 and an encoding circuit 204. It should be noted that the video encoder architecture shown in FIG. 2 is for illustrative purposes only, and is not meant to be a limitation of the present invention. For example, the architecture of the encoding circuit 204 may vary, depending upon the coding standard. The encoding circuit 204 encodes a video frame (e.g., projection-based frame IMG which has the 360-degree content represented by the projection faces arranged in the 360 VR projection layout L_VR) to generate a part of the bitstream BS. As shown in FIG. 2, the encoding circuit 204 includes a residual calculation circuit 211, a transform circuit (denoted by "T") 212, a quantization circuit (denoted by "Q") 213, an entropy encoding circuit (e.g., a variable length encoder) 214, an inverse quantization circuit (denoted by "IQ") 215, an inverse transform circuit (denoted by "IT") 216, a reconstruction circuit 217, at least one in-loop filter 218, a reference frame buffer 219, an inter prediction circuit 220 (which includes a motion estimation circuit (denoted by "ME") 221 and a motion compensation circuit (denoted by "MC") 222), an intra prediction circuit (denoted by "IP") 223, and an intra/inter mode selection switch 224. The in-loop filter (s) 218 may include a de-blocking filter, a sample adaptive offset (SAO) filter, and/or an adaptive loop filter (ALF).

It should be noted that a reconstructed frame IMG_R generated from the reconstruction circuit 217 is stored into the reference frame buffer 219 to serve as a reference frame after being processed by the in-loop filter (s) 218. The reconstructed frame IMG_R may be regarded as a decoded version of the projection-based frame IMG. Hence, the reconstructed frame IMG_R also has a 360-degree image content represented by projection faces arranged in the same 360 VR projection layout L_VR. In this embodiment, the reconstructed frame IMG_R is received by the in-loop filter (s) 218, and an SAO filter 226 (denoted by "SAO") is coupled between the reconstruction circuit 217 and the reference buffer 219. That is, in-loop filtering applied to the reconstructed frame IMG_R includes SAO filtering.

The major difference between the encoding circuit 204 and a typical encoding circuit is that the SAO filter 226 can be instructed by the control circuit 202 to enable a proposed function that blocks SAO filtering from being applied across a virtual boundary (e.g., a discontinuous boundary resulting from packing of projection faces). For example, the control circuit 202 generates a control signal Cl to enable the proposed function at the SAO filter 226. In addition, the control circuit 202 may be further used to set one or more syntax elements (SEs) that are related to enabling/disabling the proposed function at the SAO filter 226, where the syntax element(s) SE are signaled to a video decoder via the bitstream BS generated from the entropy encoding circuit 214.

Figure 3:
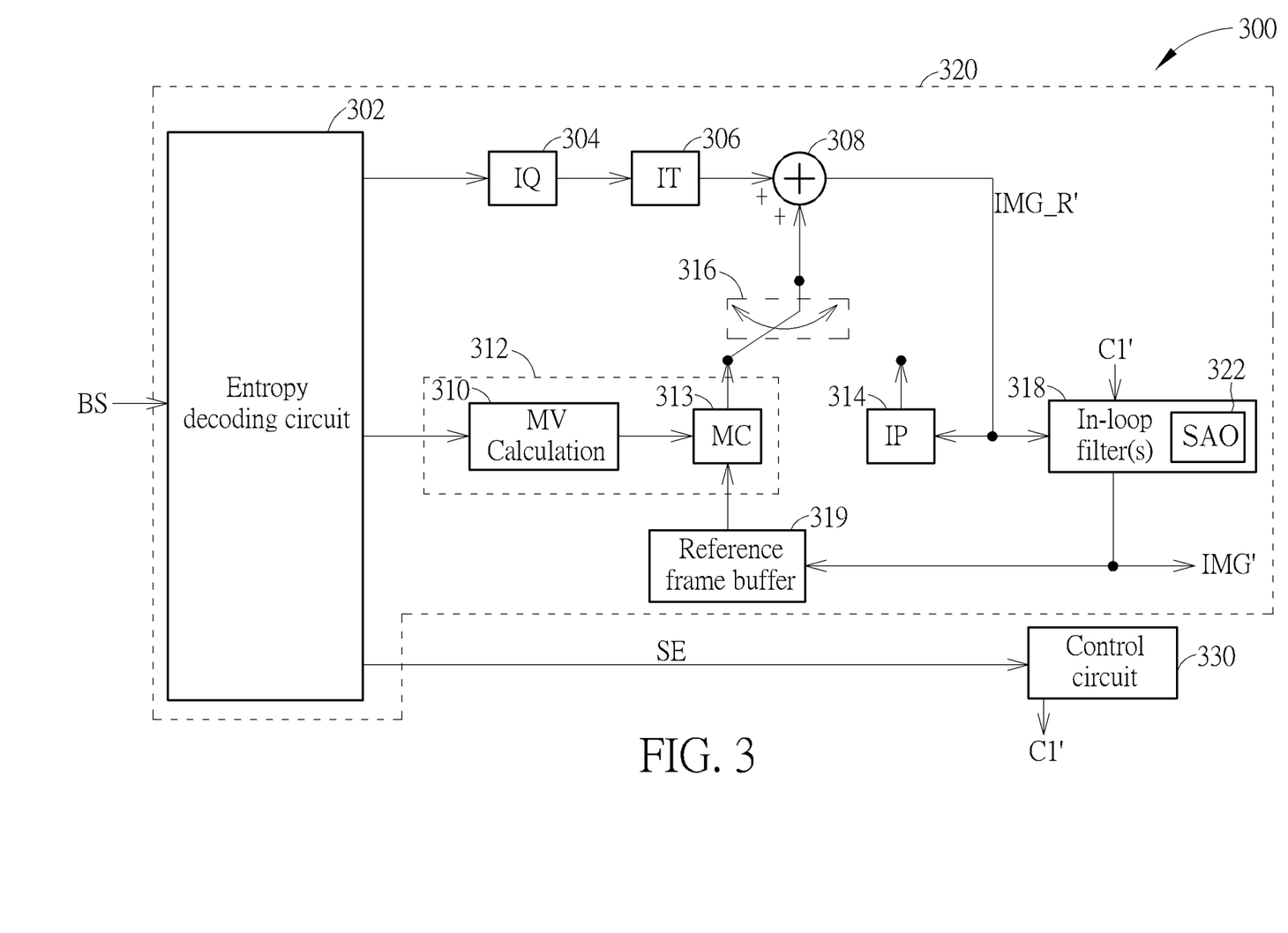
FIG. 3 is a diagram illustrating a video decoder according to an embodiment of the present invention.

FIG. 3 is a diagram illustrating a video decoder according to an embodiment of the present invention. The video decoder 122 shown in FIG. 1 may be implemented using the video decoder 300 shown in FIG. 3. The video decoder 300 may communicate with a video encoder (e.g., video encoder 100 shown in FIG. 1 or video encoder 200 shown in FIG. 2) via a transmission means such as a wired/wireless communication link or a storage medium. In this embodiment, the video decoder 300 receives the bitstream BS, and decodes a part of the received bitstream BS to generate a decoded frame IMG'. As shown in FIG. 3, the video decoder 300 includes a decoding circuit 320 and a control circuit 330. It should be noted that the video decoder architecture shown in FIG. 3 is for illustrative purposes only, and is not meant to be a limitation of the present invention. For example, the architecture of the decoding circuit 320 may vary, depending upon the coding standard. The decoding circuit 320 includes an entropy decoding circuit (e.g., a variable length decoder) 302, an inverse quantization circuit (denoted by "IQ") 304, an inverse transform circuit (denoted by "IT") 306, a reconstruction circuit 308, an inter prediction circuit 312 (which includes a motion vector calculation circuit (denoted by "MV Calculation") 310 and a motion compensation circuit (denoted by "MC") 313), an intra prediction circuit (denoted by "IP") 314, an intra/inter mode selection switch 316, at least one in-loop filter (e.g., de-blocking filter, SAO filter, and/or ALF) 318, and a reference frame buffer 319. In this embodiment, the projection-based frame IMG to be encoded by the video encoder 100 has a 360-degree content represented by projection faces arranged in the 360 VR projection layout L_VR. Hence, after the bitstream BS is decoded by the video decoder 300, the decoded frame IMG' also has a 360-degree image content represented by projection faces arranged in the same 360 VR projection layout L_VR. A reconstructed frame IMG_R' generated from the reconstruction circuit 308 is stored into the reference frame buffer 319 to serve as a reference frame and also acts as the decoded frame IMG' after being processed by the in-loop filter(s) 318. Hence, the reconstructed frame IMG_R' also has a 360-degree image content represented by projection faces arranged in the same 360 VR projection layout L_VR. In this embodiment, the reconstructed frame IMG_R' is received by the in-loop filter(s) 318, and an SAO filter 322 (denoted by "SAO") is coupled between the reconstruction circuit 308 and the reference buffer 319. That is, in-loop filtering applied to the reconstructed frame IMG_R' includes SAO filtering.

The major difference between the decoding circuit 320 and a typical decoding circuit is that the SAO filter 322 can be instructed by the control circuit 330 to enable a proposed function that blocks SAO filtering from being applied across a virtual boundary (e.g., a discontinuous boundary resulting from packing of projection faces). For example, the control circuit 330 generates a control signal Cl' to enable the proposed function at the SAO filter 322. In addition, the entropy decoding circuit 302 is further used to process the bitstream BS to obtain syntax element(s) SE that are related to enabling/disabling the proposed function at the SAO filter 322. Hence, the control circuit 330 of the video decoder 300 can refer to the parsed syntax element(s) SE to determine whether to enable the proposed function at the SAO filter 322.

In the present invention, the 360 VR projection layout L_VR may be any available projection layout. For example, the 360 VR projection layout L_VR may be a cube-based projection layout. In practice, the proposed coding tool at the SAO filter 226/322 may be adopted to process 360 VR frames having projection faces packed in other projection layouts.

Figure 4:
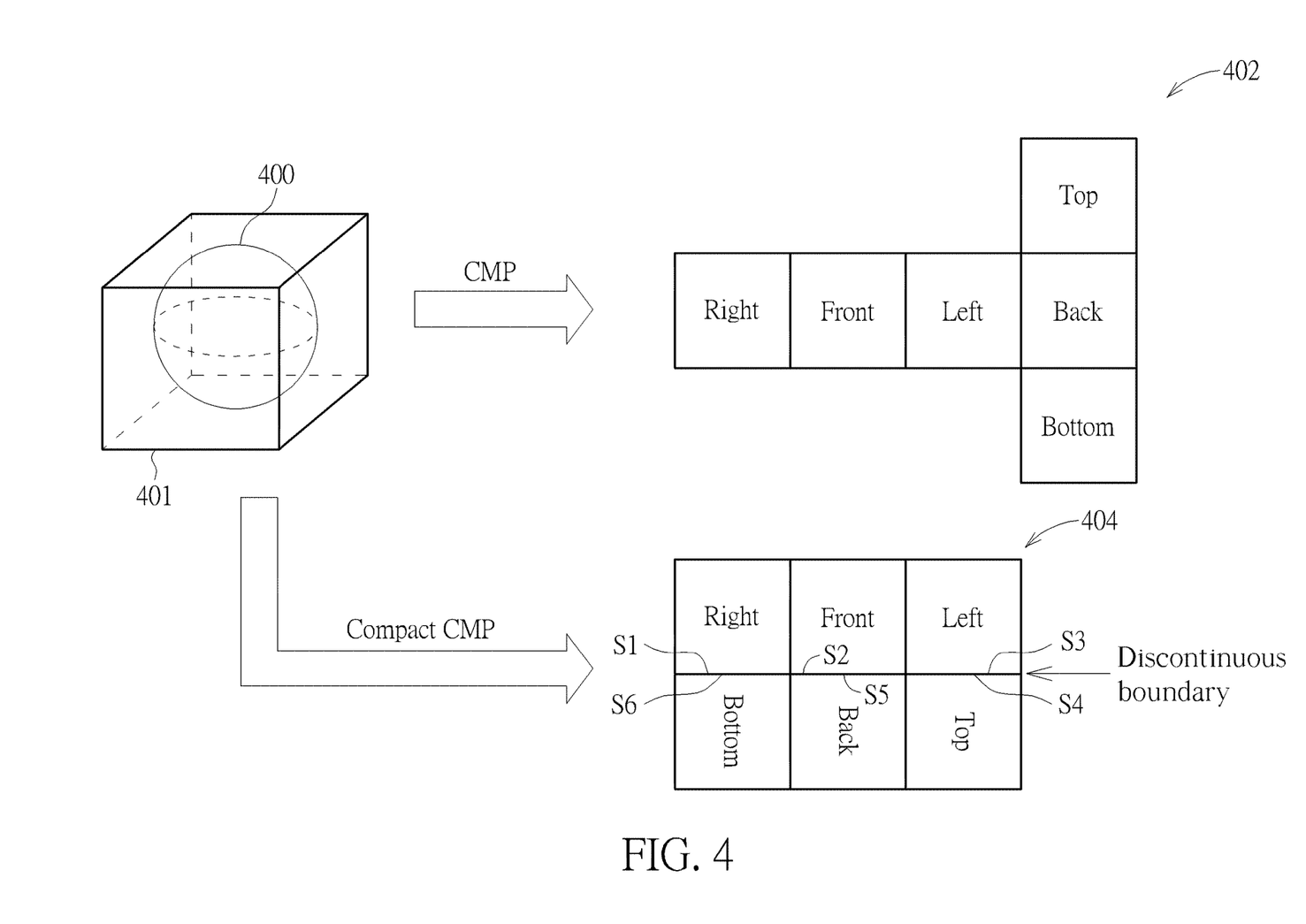
FIG. 4 is a diagram illustrating cube-based projection according to an embodiment of the present invention.

FIG. 4 is a diagram illustrating cube-based projection according to an embodiment of the present invention. The 360-degree content on a sphere 400 is projected onto six faces of a cube 401 in a three-dimensional (3D) space, including a top face, a bottom face, a left face, a front face, a right face, and a back face. Specifically, an image content of a north polar region of the sphere 400 is projected onto the top face of the cube 401, an image content of a south polar region of the sphere 400 is projected onto the bottom face of the cube 401, and an image content of an equatorial region of the sphere 400 is projected onto the left face, the front face, the right face, and the back face of the cube 401.

Square projection faces to be packed in a projection layout of the cube-based projection are derived from six faces of the cube 401, respectively. For example, a square projection face (labeled by "Top") on a two-dimensional (2D) plane is derived from the top face of the cube 401 in the 3D space, a square projection face (labeled by "Back") on the 2D plane is derived from the back face of the cube 401 in the 3D space, a square projection face (labeled by "Bottom") on the 2D plane is derived from the bottom face of the cube 401 in the 3D space, a square projection face (labeled by "Right") on the 2D plane is derived from the right face of the cube 401 in the 3D space, a square projection face (labeled by "Front") on the 2D plane is derived from the front face of the cube 401 in the 3D space, and a square projection face (labeled by "Left") on the 2D plane is derived from the left face of the cube 401 in the 3D space.

When the 360 VR projection layout L_VR is set by a cubemap projection (CMP) layout 402 shown in FIG. 4, the square projection faces "Top", "Back", "Bottom", "Right", "Front", and "Back" are packed in the CMP layout 402 corresponding to an unfolded cube. However, the projection-based frame IMG to be encoded is required to be rectangular. If the CMP layout 402 is directly used for creating the projection-based frame IMG, the projection-based frame IMG has to be filled with dummy areas (e.g., black areas, gray areas, or white areas) to form a rectangular frame for encoding. Alternatively, the projection-based frame IMG can have projected image data arranged in a compact projection layout to avoid using dummy areas (e.g., black areas, gray areas, or white areas). As shown in FIG. 4, the square projection faces "Top", "Back" and "Bottom" are rotated and then packed in the compact CMP layout 404. Hence, the square projection faces "Top", "Back", "Bottom", "Right", "Front", and "Back" are arranged in the compact CMP layout 404 that is a 3×2 layout. In this way, the coding efficiency can be improved.

However, in accordance with the compact CMP layout 404, it is possible that packing of square projection faces may result in image content discontinuity edges between adjacent square projection faces. As shown in FIG. 4, the projection-based frame IMG with the compact CMP layout 404 has a top sub-frame (which is one 3×1 face row consisting of square projection faces "Right", "Front" and "Left") and a bottom sub-frame (which is the other 3×1 face row consisting of square projection faces "Bottom", "Back" and "Top"). There is an image content discontinuity boundary between the top sub-frame and the bottom sub-frame. Specifically, the face edge S1 of the square projection face "Right" connects with the face edge S6 of the square projection face "Bottom", the face edge S2 of the square projection face "Front" connects with the face edge S5 of the square projection face "Back", and the face edge S3 of the square projection face "Left" connects with the face edge S4 of the square projection face "Top", where there is image content discontinuity between face edges S1 and S6, there is image content discontinuity between face edges S2 and S5, and there is image content discontinuity between face edges S3 and S4. Hence, a discontinuous boundary between the top sub-frame and the bottom sub-frame includes a discontinuous edge between projection faces "Right" and "Bottom", a discontinuous edge between projection faces "Front" and "Back", and a discontinuous edge between projection faces "Left" and "Top". The picture quality around the discontinuous boundary between the top sub-frame and the bottom sub-frame of a reconstructed projection-based frame (e.g., IMG_R or IMG_R') will be degraded by a typical SAO filter that applies a typical SAO filtering process to pixels located on a bottom sub-frame boundary of the top sub-frame and pixels located on a top sub-frame boundary of the bottom sub-frame due to the fact that pixels on opposite sides of the discontinuous boundary between the top sub-frame and the bottom sub-frame are not 'real' neighboring pixels. In one embodiment of the present invention, the discontinuous boundary between the top sub-frame and the bottom sub-frame shown in FIG. 4 may be defined as a virtual boundary. That is, for SAO filtering of a reconstructed frame IMG_R/IMG_R', a discontinuous boundary resulting from packing of projection faces is aligned with one virtual boundary defined in the reconstructed frame IMG_R/IMG_R'.

A syntax element (e.g. sps_loop_filter_across_virtual_boundaries_disabled_present_flag in Table 1) may be signaled to specify that the in-loop filtering processes are disabled across virtual boundaries. If the flag of loop filters disabled across virtual boundaries is true (e.g., sps_loop_filter_across_virtual_boundaries_disabled_present_flag==1), the number of vertical/horizontal virtual boundaries (e.g., sps_num_ver_virtual_boundaries and sps_num_ver_virtual_boundaries in Table 1) are also signaled. The x positions of the vertical virtual boundaries (e.g., sps_virtual_boundaries_pos_x[i] in Table 1) are signaled when the number of vertical virtual boundaries are greater than 0, and the y positions of the horizontal virtual boundaries (e.g., sps_virtual_boundaries_pos_y[i] in Table 1) are signaled when the number of horizontal virtual boundaries are greater than 0. The positions may be signaled in unit of a pre-defined value to reduce the bit-number, such as in unit of 8, and the positions are signaled in luma positions. Additionally, the syntax elements can also be signaled in a picture header so that the positions of vertical/horizontal virtual boundaries, the number of vertical/horizontal virtual boundaries, and the flag of loop filters disabled across virtual boundaries can vary in different pictures.

TABLE 1

| | Descriptor |
|---|---|
| seq_parameter_set_rbsp( ) { | |
| ... | |
| sps_loop_filter_across_virtual_boundaries_disabled_present_flag | u(1) |
| if( sps_loop_filter_across_virtual_boundaries_disabled_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_ver_virtual_boundaries | u(2) |
| for( i = 0; i < sps_num_hor_virtual_boundaries; i++ ) | |
| sps_virtual_boundaries_pos_y[ i ] | u(13) |
| } | |
| ... | |

Each of the SAO filters 226 and 322 may be a sample-based SAO filter which is operated on a coding tree unit (CTU) basis. A CTU consists of coding tree blocks (CTB) of three color components. That is, the CTU has one luma CTB and two chroma CTBs. The luma CTB consists of luma (Y) samples. One chroma CTB consists of chroma (Cb) samples, and the other chroma CTB consists of chroma (Cr) samples. In other words, the SAO filtering process may use a block (e.g., CTB) as a basic processing unit, where pixels in the block may be luma samples or chroma samples. In one exemplary design, the SAO filter 226/322 may be implemented by dedicated hardware used to perform an SAO filtering process upon pixels in a block. In another exemplary design, the SAO filter 226/322 may be implemented by a general purpose processor that executes a program code to perform an SAO filtering process upon pixels in a block. However, these are for illustrative purposes only, and are not meant to be limitations of the present invention.

Figure 5:
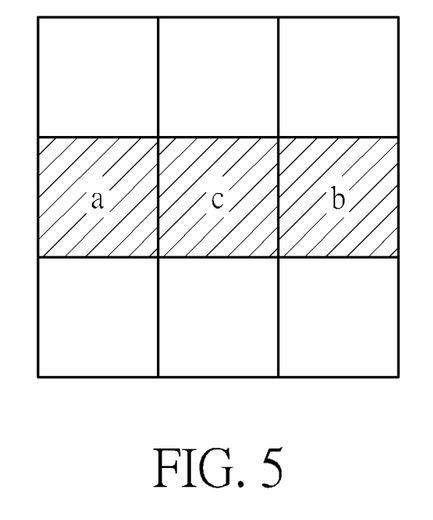
FIG. 5 is a diagram illustrating a horizontal pattern (SAO EO class=0) used by pixel classification under the EO mode.
Figure 6:
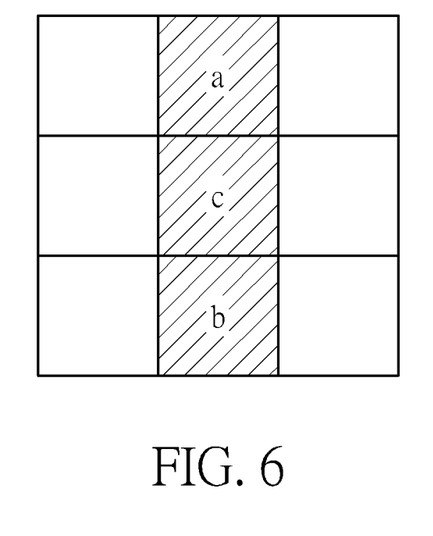
FIG. 6 is a diagram illustrating a vertical pattern (SAO EO class==1) used by pixel classification under the EO mode.
Figure 7:
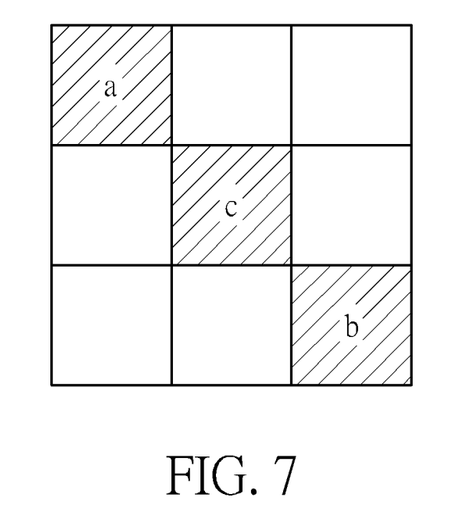
FIG. 7 is a diagram illustrating a 135-degree diagonal pattern (SAO EO class==2) used by pixel classification under the EO mode.
Figure 8:
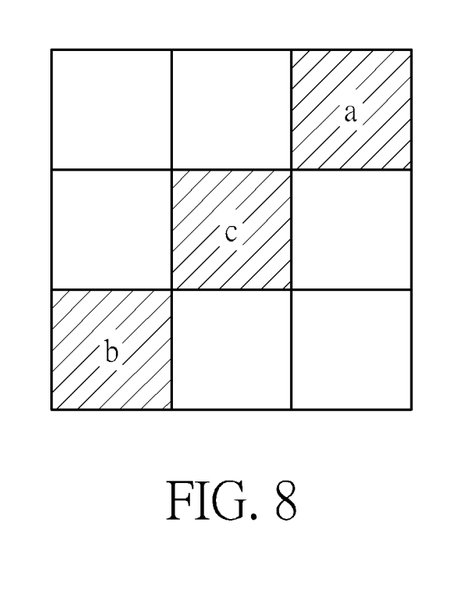
FIG. 8 is a diagram illustrating a 45-degree diagonal pattern (SAO EO class==3) used by pixel classification under the EO mode.

Each of the SAO filters 226 and 322 supports three different filter modes, including a not applied mode (SAO type=0), a band offset (BO) mode (SAO type=1), and an edge offset (EO) mode (SAO type=2). The pixels remain the same if the filter mode is the not applied mode. For the BO mode, the SAO filtering process of a current pixel in a block depends on the intensity of the current pixel. That is, the pixels in a block are classified into multiple bands according to their pixel intensities and add offset values to one or more bands. For the EO mode, the SAO filtering process of a current pixel in a block depends on the relationship between the current pixel and neighboring pixels. In addition, there are four directional patterns for the EO mode. FIG. 5 is a diagram illustrating a horizontal pattern (SAO EO class=0) used by pixel classification under the EO mode. FIG. 6 is a diagram illustrating a vertical pattern (SAO EO class=1) used by pixel classification under the EO mode. FIG. 7 is a diagram illustrating a 135-degree diagonal pattern (SAO EO class=2) used by pixel classification under the EO mode. FIG. 8 is a diagram illustrating a 45-degree diagonal pattern (SAO EO class=3) used by pixel classification under the EO mode. In each of FIGS. 5-8, a pixel value of a current pixel is labeled by "c", and pixel values of neighboring pixels are labeled by "a" and "b", respectively. For each directional pattern, the pixels in the same block are classified into different edge types according to the relationship between a current pixel and its neighboring pixels. For example, the current pixel may be classified into one of five edge types according to following classification rules, where the edge types can be monotonic, minimum, maximum, flat segment with a downward slope, and flat segment with an upward slope.

TABLE 2

| Edge type | edgeIdx | Condition |
|---|---|---|
| monotonic | 0 | (C < one neighbor && C > another neighbor) \|\| (C == two neighbors) |
| minimum | 1 | C < two neighbors |
| flat segment with a downward slope | 2 | C < one neighbor && C == another neighbor |
| flat segment with an upward slope | 3 | C > one neighbor && C == another neighbor |
| Maximum | 4 | C > two neighbors |

In this embodiment, an offset value of each of different edge types (edgeIdx=0, 1, 2, 3, and 4) for a given EO class is properly calculated at the encoder-side SAO filter 226 according to rate-distortion optimization (RDO) and explicitly signaled to the decoder-side SAO filter 322 for reducing the sample distortion effectively, while the classification of each pixel is performed at both the encoder-side SAO filter 226 and the decoder-side SAO filter 322 for saving side information significantly. For example, information of an EO class selected for a block and information of offset values selected for edge types of the EO class may be signaled from the video encoder 200 to the video decoder 300. Specifically, SAO parameters encoded in the bitstream BS may contain SAO type information and offset information for the block that is SAO filtered using an EO mode. The SAO type information includes one syntax element indicating that an SAO type is an EO mode and another syntax element indicative of the selected EO class. The offset information includes syntax elements that indicate offset values of different edge types (edgeIdx=0, 1, 2, 3, and 4) for the selected EO class. Hence, the video decoder 300 obtains SAO parameters of the block from decoding the bitstream BS. With regarding to an EO-mode SAO process of the same block in the reconstructed frames IMG_R and IMG_R', the behavior of the decoder-side SAO filter 322 is similar to that of the encoder-side SAO filter 226. For example, after a current pixel in a current block of the reconstructed projection-based frame IMG_R' is classified into one of edge types for a selected EO class that is indicated by the SAO type information derived from decoding the bitstream BS, the SAO filter 322 may add an offset value of the edge type into which the pixel is classified to a value of the pixel, where the offset value of the edge type is indicated by the offset information derived from decoding the bitstream BS.

However, it is possible that at least one neighboring pixel and the current pixel of a selected directional pattern that is used for determining an edge type are on opposite sides of a virtual boundary defined in a reconstructed frame (e.g., a discontinuous boundary between a top sub-frame and a bottom sub-frame of the reconstructed projection-based frame IMG_R/IMG_R' using the compact CMP layout 404 as illustrated in FIG. 4). The present invention proposes that, for each of the SAO filters 226 and 322, the filtering process can be disabled when EO mode is applied to the current pixel.

Figure 9:
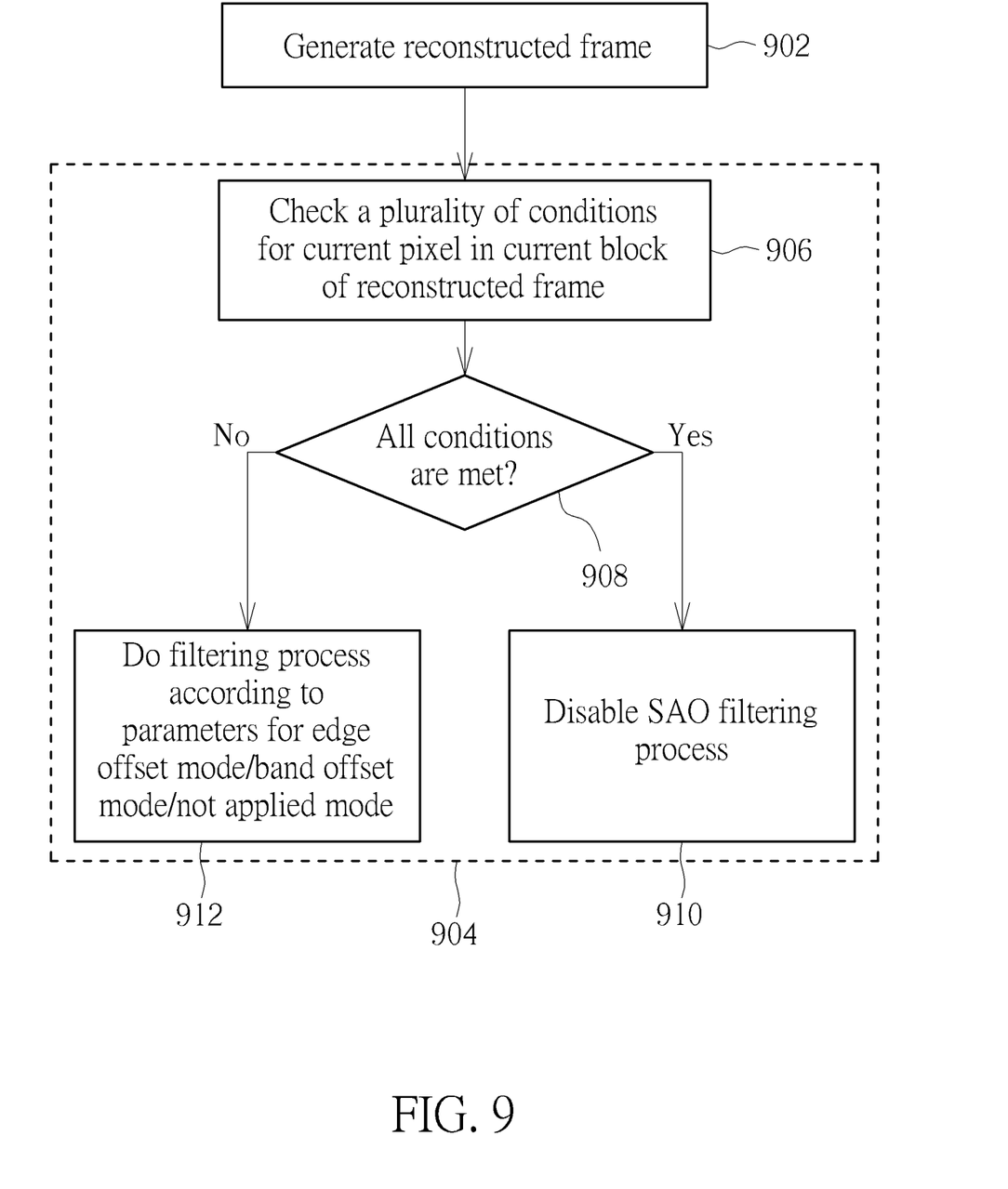
FIG. 9 is a flowchart illustrating a video processing method according to an embodiment of the present invention.

FIG. 9 is a flowchart illustrating a video processing method according to an embodiment of the present invention. The video processing method may be employed by each of video encoders 116, 200 and video decoders 122, 300. At step 902, a process of generating a reconstructed frame is performed. For example, the encoding circuit 204 receives a video frame (e.g., projection-based frame IMG which has the 360-degree content represented by projection faces arranged in the 360 VR projection layout L_VR), and encodes the video frame to generate a part of a bitstream (e.g., a part of the bitstream BS that includes encoded information of the projection-based frame IMG). When encoding the video frame, the encoding circuit 204 generates the reconstructed frame IMG_R at the reconstruction circuit 217. For another example, the decoding circuit 320 receives a bitstream (e.g., bitstream BS generated from the encoding circuit 204), and decodes a part of the bitstream, wherein the part of the bitstream includes encoded information of a video frame (e.g., encoded information of the projection-based frame IMG).

At step 904, in-loop filtering is applied to the reconstructed frame, wherein the in-loop filtering includes performing an SAO filtering operation. For example, the SAO filtering operation, including steps 906, 908, 910, and 912, is performed at the SAO filter 226 of the encoding circuit 204. For another example, the SAO filtering operation, including steps 906, 908, 910, and 912, is performed at the SAO filter 322 of the decoding circuit 320.

At step 906, the SAO filtering operation checks a plurality of conditions for a current pixel in a current block of the reconstructed frame IMG_R/IMG_R'. In this embodiment, the conditions may include whether an EO mode is applied to the current pixel, whether a flag of loop filters disabled across virtual boundaries is true, and whether the filtering process is applied across one virtual boundary defined in the reconstructed frame IMG_R/IMG_R'. For example, when an SAO type of the current block is set by an EO mode, the first condition is met; when the syntax element sps_loop_filter_across_virtual_boundaries_disabled_present_flag is equal to 1, the second condition is met; and when the current pixel and at least one neighboring pixel for a selected SAO EO class (i.e., a selected directional pattern) under the EO mode are located on different sides of one virtual boundary, the third condition is met.

If at least one of the conditions checked in step 906 is not met (step 908), the flow proceeds with step 912. At step 912, the SAO filter 226/322 applies SAO filtering to the current pixel in a typical way, regardless of the virtual boundaries defined in the reconstructed frame IMG_R/IMG_R'. That is, the current pixel is SAO filtered according to parameters specified for an EO mode, a BO mode or a not applied mode, depending upon an SAO type selected by SAO filtering of the current block.

If all conditions checked in step 906 are met (step 908), the flow proceeds with step 910. At step 910, the SAO filter 226/322 keeps a value of the current pixel unchanged by blocking the SAO filtering operation of the current pixel from being applied across a virtual boundary defined in the reconstructed frame. Since SAO filtering is disabled across virtual boundaries under EO mode, visual quality and/or coding efficiency around the virtual boundaries can be improved. For better understanding of technical features of the proposed SAO filter design, several scenarios of disabling SAO filtering of a current pixel under an EO mode are provided as below.

In a first scenario, the reconstructed frame IMG_R/IMG_R' has a virtual boundary that is a vertical virtual boundary, a selected directional pattern of a current pixel and neighboring pixels under an EO mode is not a vertical pattern shown in FIG. 6, the current pixel is located on a left side of the vertical virtual boundary and close/near to the vertical virtual boundary, and at least one of the neighboring pixels is located on a right side of the vertical virtual boundary. The SAO filtering process of the current pixel can be disabled when a flag of loop filters disabled across virtual boundaries is true. For example, the x position $xS_i$ of the current pixel in a current CTB with width nCtbSw is equal to the x position VirtualBoundariesPosX[n] of one of the vertical virtual boundaries minus one, and the filtering process of the current pixel can be disabled, where i is selected from {0, . . . , nCtbSw−1}. A variable VirtualBoundariesNumVer specifies the number of vertical virtual boundaries in the reconstructed frame IMG_R/IMG_R'. A variable cIdx specifies the color component index of the CTB, and is equal to 0 for Y, 1 for Cb, and 2 for Cr. A pair of variables (rx, ry) specifies the CTB location. An example of the semantic design is as follows:

VirtualBoundariesDisabledFlag is equal to 1 and $xS_i$ is equal to ((VirtualBoundariesPosX[n]/scaleWidth)−1) for any n=0 . . . VirtualBoundariesNumVer−1 and SaoEoClass[cIdx] [rx] [ry] is not equal to 1.

In a second scenario, the reconstructed frame IMG_R/IMG_R' has a virtual boundary that is a vertical virtual boundary, a selected directional pattern of a current pixel and neighboring pixels under an EO mode is not a vertical pattern shown in FIG. 6, the current pixel is located on a right side of the vertical virtual boundary and close/near to the vertical virtual boundary, and at least one of the neighboring pixels is located on a left side of the vertical virtual boundary. The SAO filtering process of the current pixel can be disabled when a flag of loop filters disabled across virtual boundaries is true. For example, the x position $xS_i$ of the current pixel in a current CTB with width nCtbSw is equal to the x position VirtualBoundariesPosX[n] of one of the vertical virtual boundaries, and the filtering process of the current pixel can be disabled, where i is selected from {0, . . . , nCtbSw−1}. An example of the semantic design is as follows:

VirtualBoundariesDisabledFlag is equal to 1 and $xS_i$ is equal to (VirtualBoundariesPosX[n]/scaleWidth) for any n=0 . . . VirtualBoundariesNumVer−1 and SaoEoClass[cIdx] [rx] [ry] is not equal to 1.

In a third scenario, the reconstructed frame IMG_R/IMG_R' has a virtual boundary that is a horizontal virtual boundary, a selected directional pattern of a current pixel and neighboring pixels under an EO mode is not a horizontal pattern shown in FIG. 5, the current pixel is located above the horizontal virtual boundary and close/near to the horizontal virtual boundary, and at least one of the neighboring pixels is located below of the horizontal virtual boundary. The SAO filtering process of the current pixel can be disabled when a flag of loop filters disabled across virtual boundaries is true. For example, the y position $yS_j$ of a current pixel in a current CTB with height nCtbSh is equal to the y position VirtualBoundariesPosY[n] of one of the horizontal virtual boundaries minus one, and the filtering process of the current pixel can be disabled, where j is selected from {0, . . . , nCtbSh−1}. A variable VirtualBoundariesNumHor specifies the number of horizontal virtual boundaries in the reconstructed frame IMG_R/IMG_R'. An example of the semantic design is as follows:

VirtualBoundariesDisabledFlag is equal to 1 and $yS_j$ is equal to ((VirtualBoundariesPosY[n]/scaleHeight)−1) for any n=0 . . . VirtualBoundariesNumHor−1 and SaoEoClass [cIdx][rx][ry] is not equal to 0.

In a fourth scenario, the reconstructed frame IMG_R/IMG_R' has a virtual boundary that is a horizontal virtual boundary, a selected directional pattern of a current pixel and neighboring pixels under an EO mode is not a horizontal pattern shown in FIG. 5, the current pixel is located below the horizontal virtual boundary and close/near to the horizontal virtual boundary, and at least one of the neighboring pixels is located above of the horizontal virtual boundary. The SAO filtering process of the current pixel can be disabled when a flag of loop filters disabled across virtual boundaries is true. For example, the y position $yS_j$ of the current pixel in a current CTB with height nCtbSh is equal to the y position VirtualBoundariesPosY[n] of one of the horizontal virtual boundaries, and the filtering process of the current pixel can be disabled, where j is selected from {0, . . . , nCtbSh−1}. An example of the semantic design is as follows:

VirtualBoundariesDisabledFlag is equal to 1 and $yS_j$ is equal to (VirtualBoundariesPosY[n]/scaleHeight) for any n=0 . . . VirtualBoundariesNumHor−1 and SaoEoClass [cIdx][rx][ry] is not equal to 0.

The above conditions are applicable for both luma and chroma components. That is, the current pixel mentioned above may be a luma sample when the SAO filter 226/322 is dealing with SAO filtering of a luma CTB of a CTU, and may be a chroma sample when the SAO filter 226/322 is dealing with SAO filtering of a chroma CTB of the CTU. As mentioned above, positions of virtual boundaries are signaled in luma positions. For SAO filtering of luma components, it is not necessary to scale/convert the positions of the virtual boundaries for checking the abovementioned conditions to indicate whether the filtering process is disabled across virtual boundaries in a luma CTB. Hence, scaleWidth and scaleHeight may be omitted from above semantic designs. Alternatively, for SAO filtering of luma components, the positions can be converted/scaled by 1 (i.e., scaleWidth=1 and scaleHeight=1) for checking the above-mentioned conditions to indicate whether the filtering process is disabled across virtual boundaries in a luma CTB.

For SAO filtering of chroma components, the positions of the virtual boundaries, which are signaled in luma positions, can be scaled/converted to chroma positions, where scaleWidth≠1 and scaleHeight≠1. With the scaled/converted positions, the abovementioned conditions can be checked to indicate whether the filtering process is disabled across virtual boundaries in a chroma CTB.

As mentioned above, when all conditions checked in step 906 are met, the SAO filter 226/322 blocks the SAO filtering operation of the current pixel included in the reconstructed frame from being applied across a virtual boundary defined in the reconstructed frame. In a first exemplary design of disabling an SAO filtering process for a current pixel, the SAO filter 226/322 may add a zero offset to the value of the current pixel, thus making the value of the current pixel unchanged under the EO mode.

In a second exemplary design of disabling an SAO filtering process for a current pixel, the SAO filter 226/322 may intentionally set an edge type of the current pixel by a monotonic type (edgeIdx=0). In general, an offset for the monotonic type is a zero value. Hence, the value of the current pixel remains unchanged under the EO mode.

In a third exemplary design of disabling an SAO filtering process for a current pixel, the SAO filter 226/322 may directly skip the SAO filtering operation of the current pixel. Since no arithmetic operation is performed to add an offset value to the value of the current pixel, the value of the current pixel remains unchanged under the EO mode.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
receiving a reconstructed frame; and
applying in-loop filtering, by at least one in-loop filter, to the reconstructed frame, comprising:
performing a sample adaptive offset (SAO) filtering operation, comprising:
checking if a filter mode of the SAO filtering operation of a current pixel is an edge offset (EO) mode;
checking if a flag of loop filters disabled across virtual boundaries is true;
checking if a position of the current pixel and a position of a virtual boundary meet a predetermined criterion; and
in response to the filter mode of the SAO filtering operation of the current pixel being the EO mode, the flag of loop filters disabled across virtual boundaries being true, and the position of the current pixel and the position of the virtual boundary meeting the predetermined criterion, setting an edge type of the current pixel by a monotonic type regardless of a value of the current pixel and values of neighboring pixels of the current pixel, for keeping the value of the current pixel unchanged.

2. The video processing method of claim 1, wherein the reconstructed frame is a projection-based frame that comprises a plurality of projection faces packed in a projection layout of a 360-degree Virtual Reality (360 VR) projection from which a 360-degree image content of a sphere is mapped onto the projection faces, and the virtual boundary is aligned with an image content discontinuity boundary resulting from packing of the projection faces in the projection-based frame.

3. The video processing method of claim 1, wherein the virtual boundary is a vertical virtual boundary; a selected directional pattern of the current pixel and neighboring pixels under the EO mode is not a vertical pattern; the current pixel is located on a left side of the vertical virtual boundary; and one of the neighboring pixels is located on a right side of the vertical virtual boundary.

4. The video processing method of claim 1, wherein the virtual boundary is a vertical virtual boundary; a selected directional pattern of the current pixel and neighboring pixels under the EO mode is not a vertical pattern; the current pixel is located on a right side of the vertical virtual boundary; and one of the neighboring pixels is located on a left side of the vertical virtual boundary.

5. The video processing method of claim 1, wherein the virtual boundary is a horizontal virtual boundary; a selected directional pattern of the current pixel and neighboring pixels under the EO mode is not a horizontal pattern; the current pixel is located above the horizontal virtual boundary; and one of the neighboring pixels is located below the horizontal virtual boundary.

6. The video processing method of claim 1, wherein the virtual boundary is a horizontal virtual boundary; a selected directional pattern of the current pixel and neighboring pixels under the EO mode is not a horizontal vertical pattern; the current pixel is located below the horizontal virtual boundary; and one of the neighboring pixels is located above the horizontal virtual boundary.

7. A video processing apparatus comprising:
an encoding circuit, arranged to receive a video frame and encode the video frame to generate a part of a bitstream;
wherein when encoding the video frame, the encoding circuit is arranged to generate a reconstructed frame, and apply in-loop filtering to the reconstructed frame; the in-loop filtering comprises a sample adaptive offset (SAO) filtering operation performed at an SAO filter included in the encoding circuit; and the SAO filter is arranged to:
check if a filter mode of the SAO filtering operation of a current pixel is an edge offset (EO) mode;
check if a flag of loop filters disabled across virtual boundaries is true;
check if a position of the current pixel and a position of the virtual boundary meet a predetermined criterion; and
in response to the filter mode of the SAO filtering operation of the current pixel being the EO mode, the flag of loop filters disabled across virtual boundaries being true, and the position of the current pixel and the position of a virtual boundary meeting the predetermined criterion, set an edge type of the current pixel by a monotonic type regardless of a value of the current pixel and values of neighboring pixels of the current pixel, for keeping the value of the current pixel unchanged.

8. A video processing apparatus comprising:
a decoding circuit, arranged to receive a bitstream and decode a part of the bitstream, wherein the part of the bitstream comprises encoded information of a video frame;
wherein when decoding the part of the bitstream, the decoding circuit is arranged to generate a reconstructed frame, and apply in-loop filtering to the reconstructed frame; the in-loop filtering comprises a sample adaptive offset (SAO) filtering operation performed at an SAO filter included in the decoding circuit; and the SAO filter is arranged to:
check if a filter mode of the SAO filtering operation of a current pixel is an edge offset (EO) mode;
check if a flag of loop filters disabled across virtual boundaries is true;
check if a position of the current pixel and a position of a virtual boundary meet a predetermined criterion; and
in response to the filter mode of the SAO filtering operation of the current pixel being the EO mode, the flag of loop filters disabled across virtual boundaries being true, and the position of the current pixel and the position of the virtual boundary meeting the predetermined criterion, set an edge type of the current pixel by a monotonic type regardless of a value of the current pixel and values of neighboring pixels of the current pixel, for keeping the value of the current pixel unchanged.

* * * * *